United States Patent
Strid

[11] Patent Number: 5,227,065
[45] Date of Patent: Jul. 13, 1993

[54] FILTER SECTOR

[75] Inventor: Kent Strid, Järbo, Sweden

[73] Assignee: Kvaerner Eureka A/S, Norway

[21] Appl. No.: 838,245

[22] PCT Filed: Sep. 24, 1990

[86] PCT No.: PCT/SE90/00609
§ 371 Date: Feb. 28, 1992
§ 102(e) Date: Feb. 28, 1992

[87] PCT Pub. No.: WO91/04090
PCT Pub. Date: Apr. 4, 1991

[30] Foreign Application Priority Data

Sep. 22, 1989 [SE] Sweden ................. 8903128

[51] Int. Cl.$^5$ .......................... B01D 29/39
[52] U.S. Cl. ................. 210/331; 210/346; 210/404; 210/486
[58] Field of Search .......... 210/324, 330, 331, 345, 210/346, 347, 404, 486, 487

[56] References Cited

U.S. PATENT DOCUMENTS 2,591,720 4/1952 Peterson .
3,485,376 12/1969 Peterson et al. ............. 210/347
3,917,534 11/1975 Moore ......................... 210/486
3,948,779 4/1976 Jackson .
3,971,722 7/1976 Radford ....................... 210/486
4,655,920 4/1987 Ragnegard .

Primary Examiner—Robert A. Dawson
Assistant Examiner—W. L. Millard
Attorney, Agent, or Firm—Quarles & Brady

[57] ABSTRACT

A filter sector for a filter disk of a rotating filter, including folded or currugated means having ridges and valleys extending in a longitudinal direction of said means to form filtrate channels, and a filtering medium covering said means. Said means includes at least two elements (9, 10), each having parallel riges (12, 11') and valleys (11, 12') and said at least two elements are located in an at least partly overlapping relationship, such that filtrate channels (13) of one element (9) intersect with filtrate channels (14) of the other element (10). Preferably, the filter sector includes two at least substantially equally shaped elements and said elements are disposed such that there is communication between filtrate channels (13, 14) of said elements (9, 10) in zones of said partly overlapping relationship.

11 Claims, 1 Drawing Sheet

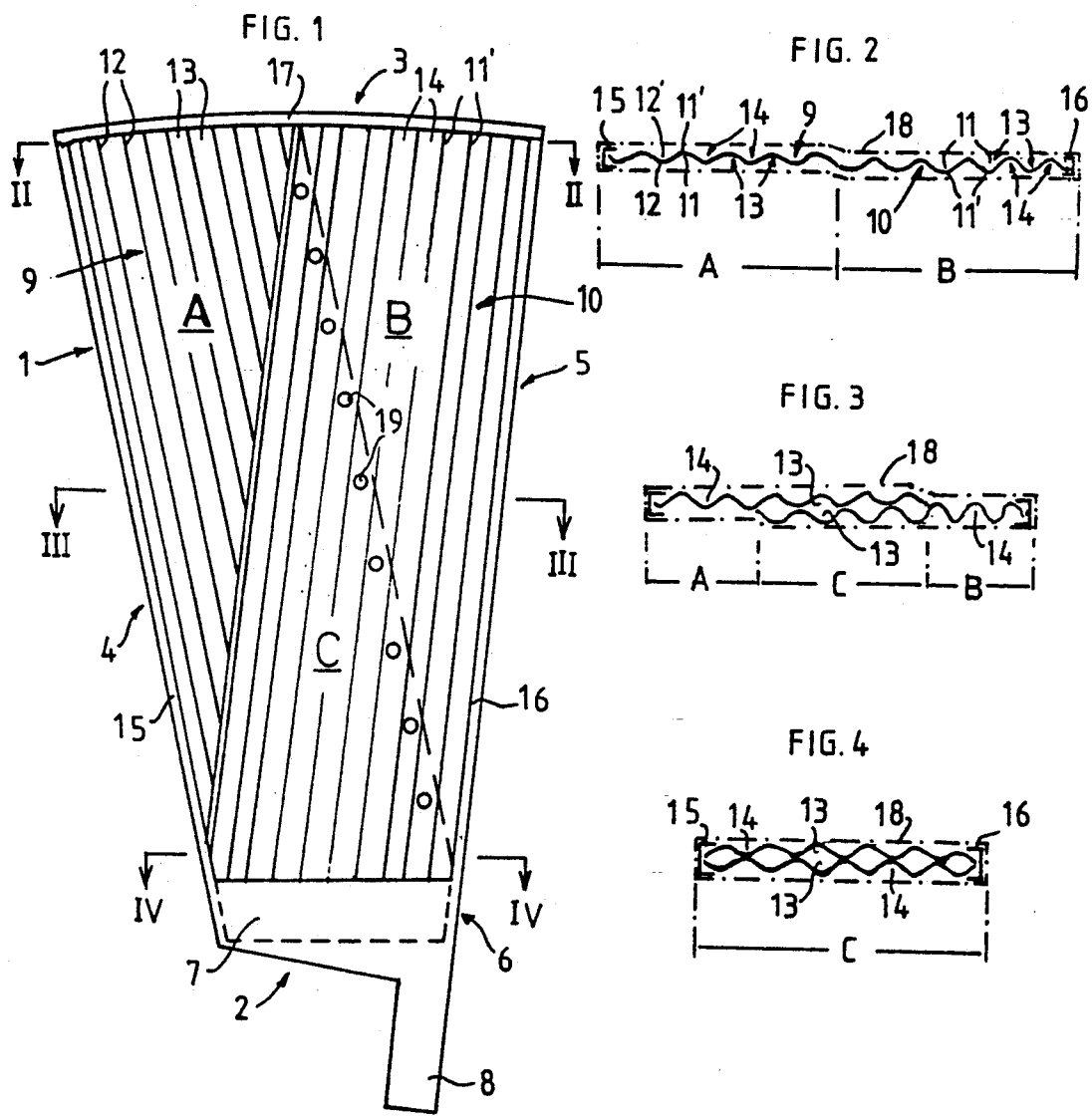

FILTER SECTOR

The present invention concerns a filter sector for a rotating filter disk in a rotating filter for filtering relatively solid particles from a slurry or a liquid suspension, such as paper pulp. A plurality of such filter sectors, each having the general shape of a truncated sector of a circle, are mounted on a rotatable shaft to form a filter disk, and, generally, a plurality of such filter disks are mounted one after the other on the shaft. The shaft is rotatably supported such that the filter disks are partially submerged in a liquid to be filtered. Upon rotation of the shaft the filter sectors are consecutively submerged in the liquid to perform filtering through a filtering medium carried by each sector and are subsequently raised above the liquid level to perform drying and removal of solids deposited on the filtering medium. The shaft includes channel means for discharging filtrate received from each of the filter sectors.

More particularly, the present invention concerns a filter sector including folded or corrugated means defining between ridges of adjacent folds or corrugations a plurality of channels extending substantially in the radial direction of the filter sector between a radially outer periphery thereof and a radially inner periphery thereof. A filter cloth or other suitable filtering medium is mounted around the folded or corrugated means to be supported by the ridges thereof. Filtering takes place through the filtering medium from both sides of the filter sector such that filtrate enters the substantially radially extending channels and is discharged through the radially inner end of the filter sector. A filter sector of this general kind, including but one folded or corrugated means, is described in SE-B-830069-3 corresponding to U.S. Pat. No. 4,655,920.

This known filter sector suffers from some major drawbacks. Since the folded or corrugated means generally comprises a metal plate, usually of acidproof steel, practically insuperable difficulties are encountered when it comes to folding, particularly since the folds or corrugations are to be located in a fan-like pattern and the filtrate discharge channels formed by the ridges and valleys are to have a gradually increasing height and a gradually increasing cross-section towards the outlet end of the filter sector. Further, filtrate running along the channels is continuously contacting the filtering medium and solids deposited thereon (and possibly partially protruding therethrough) resulting in a considerable loss of flow rate as well as a risk of re-wetting the solids.

Consequently, an object of the present invention is to provide a filter sector of the kind stated, which lends itself to a less troublesome and less expensive manufacture while still being more rigid and stable than existing filter sectors. Another object of the present invention is to provide a filter sector of the kind stated, wherein at least a substantial part of the filtrate is not in contact with the filtering medium during a substantial part of its flow towards the discharge end of the sector. Still another object of the invention is to provide a filter of the kind stated, which enables a higher dry content of the solids deposited on the filtering medium. A further object of the present invention is to provide a filter sector of the kind stated, which enables a high filtering capacity due to a large exposed area over the entire filter sector surface.

These and other objects are accomplished by a filter sector of the kind stated having the characteristic features stated in the appended claims.

In one embodiment of the present invention a filter sector includes three sector parts for receiving and discharging filtrate, viz., a first, a second and a third sector part.

The major portions of the first and the second sector parts are located radially outwards towards the outer periphery of the filter sector and circumferentially on either sides of the third sector part, and are denominated "outer sector parts", whereas the major portion of the third sector part is located radially inwards towards the discharge, or, radially inner end of the filter sector and between the first and second sector parts and is denominated "middle sector part". The filtrate channels of the outer sector parts intersect in the middle sector part.

In a preferred embodiment of the present invention there is communication between the intersecting channels in the middle part such that filtrate flowing along a channel of either of the first part and the second part of the outer sector parts can "chose" to switch to a channel of the other one of the outer sector parts, or, to remain in its original channel. In other words, the middle sector part is able to receive and discharge filtrate from both of the outer sector parts.

In an embodiment particularly advantageous from a productional viewpoint, the filter sector of the present invention is composed of two similarly shaped elements. Preferably, these elements have substantially the shape of parallelograms. The elements are so arranged that they substantially abut each other at the radially outer and circumferentially wider end of the filter sector, whereas they at least almost entirely overlap each other at the radially inner end of the filter sector. Hereby the three sector parts obtain the shapes of substantially equal isosceles triangles, the triangles of the outer sector parts having their apicis and the triangle of the middle sector having its base facing the radially inner end of the filter sector. From a viewpoint of structural strength this, in turn, brings about the advantage that the filter sector has the thickness of two elements along substantially its entire radially inner end where it is attached to the shaft and where the stresses are the greatest.

Alternatively, the filter sector can be manufactured in one piece, particularly if it is manufactured from a plastics material.

In a further preferred embodiment of the invention the connection between the intersecting filtrate channels includes, apart from the channels of one outer sector part leading into the middle sector part, holes in the channels of the other outer sector part at the transition from one outer sector part to the middle sector part.

In a still further embodiment of the invention a plate shaped element is located between the intersecting filtrate channels to provide further stability and to prevent re-wetting of the filtering medium and solids deposited thereon.

The present invention will now be described with reference to the accompanying schematic drawing, wherein:

FIG. 1 shows one side of a filter sector according to a preferred embodiment of the invention;

FIG. 2 shows a section taken along line II—II of FIG. 1;

FIG. 3 shows a section taken along line III—III of FIG. 1;

FIG. 4 shows a section taken along line IV—IV of FIG. 1; and

FIG. 5 shows at an enlarged scale a part section corresponding to FIG. 4 of an alternative embodiment of the invention.

With particular reference now to FIG. 1 there is shown a filter sector 1 according to the present invention. As a common in the art of rotating filters, the filter sector 1 has the general shape of a sector of a circle having its apex cut off to form a truncated sector of a circle. The filter sector 1 has a radially inner end 2, a radially outer end 3 and two substantially radially extending edges 4 and 5. In its radially inner end 2 the filter sector 1 has a connecting means 6 for its attachment to a non-shown rotatable shaft. The connecting means 6 includes a collecting means 7 adapted to collect filtrate received from the filter sector, and an outlet portion 8 adapted to receive filtrate from the collecting means, to lead filtrate into the shaft, and, to attach the filter sector to the shaft.

In the preferred embodiment of the present invention shown in FIGS. 1–4, the filter sector 1 includes two plates 9 and 10. The plates 9 and 10 are folded, corrugated, or, ondulated so as to define a plurality of parallel valleys 11 and ridges 12 on one side of each plate 9 and 10, and corresponding ridges 11' and valleys 12', respectively, on the opposite side of each plate, only the valleys being shown in FIG. 1. The plates 9 and 10 are shaped as substantially equal parallelograms and are placed in a partly overlapping relationship so that plate 9 is inclined to the left and plate 10 to the right according to FIG. 1. The partly overlapping relationship is such, that the plates 9 and 10 do not at all, or, to only a slight extent, overlap each other in the radially outer end 3 of the filter sector (FIG. 2), whereas the extent of overlapping gradually increases towards the radially inner end 2 of the filter sector (FIG. 3) to be complete, or, substantially complete at the radially inner end 2 (FIG. 4). By means of this arrangement, the desired truncated sector shape is achieved, and, the filter sector is given substantially radially directed filtrate channels 13 and 14 corresponding to the valleys 11 and 12', respectively.

To complete the filter sector, its substantially radially extending edges 4 and 5 are limited by ribs 15 and 16, respectively, having a substantially U-shaped channelled cross-section, and its radially outer end 3 is limited by an arcuately shaped rib 17 likewise having a substantially U-shaped channelled cross-section, the respective edges and radially outer ends of the plates 9 and 10 being introduced into the channels of the respective ribs. Further, the radially inner overlapping ends of the plates 9 and 10 are introduced into the collecting means 7, and a filtering medium, such as a filter cloth 18, for the sake of clarity shown only in FIGS. 2–4, is arranged around the plates 9 and 10 and their limiting ribs 15, 16 and 17.

Further, as a result of the arrangement of the plates 9 and 10 described above, the filter sector is divided into three substantially equally shaped parts, viz., two outer sector parts A and B, where there is just one plate layer, and one middle sector part C, where there are two plate layers due to the overlapping relationship between the plates existing in that area, and the filtrate channels 13 and 14 of the plates 9 and 10 intersect in the overlapping area, or, middle sector part C.

Now, regarding the side of the filter sector 1 shown in FIG. 1, it is evident that filtrate entering the filtrate channels 13 of plate 9 flows along these channels to be received in collecting means 7, and that filtrate entering the filtrate channels 14 of plate 10 flows along these channels also to be received in collecting means 7. However, depending on which one of channels 13 of plate 9 is regarded, filtrate flowing along channels 13 in filter sector part A is in contact with the filter cloth 18 during a longer or shorter part of the flow due to the fact that channels 13 towards edge 4 enter filter sector part C, i.e., under plate 10, later than channels towards the opposite edge of plate 9. As soon as filtrate flowing in channels 13 enters under plate 10 (into filter sector part C), it looses contact with the filter cloth 18 and, as a result, flow resistance is diminished. Also in filter sector part C, where channels 13 intersect with channels 11 of plate 10 facing downwards in FIG. 1, filtrate is free to "chose" to continue to flow in channels 13 or to switch over to any of channels 11, depending on where flow resistance is the lowest.

Evidently, in FIG. 1, the exposed area of plate 9, i.e., filter sector part A, is about one third of the entire exposed area of the filter sector 1, whereas the exposed area of plate 10 (filter sector parts B and C) is about two thirds of the entire exposed area. Consequently, plate 10 (parts B and C) receives double the amount of filtrate as compared to the amount received by plate 9 (part A). Also, filtrate flowing along channels 14 of plate 10 is in constant contact with the filter cloth 18.

In order to accomplish a more even distribution of filtrate, apertures 19 are provided in plate 10, preferably immediately after the transition between sector parts B and C. The apertures 19 are preferably arranged at the bottoms of the channels 14, or, valleys 12', which preferably are located over the innermost channel 13, or, valley 11 of plate 9. By this measure, at least a substantial part of the flow along channels 14 is introduced into the space between plates 9 and 10, i.e., into the channel 13 mentioned, from which it, again, may "chose" to switch over to a channel 13 on the back side of plate 10, and, possibly, back to a channel 13 of plate 9, depending on where the flow resistance is the lowest.

It is evident that the conditions mentioned are the same on the side of the filter sector unexposed in FIG. 1.

In certain applications of the present invention it may be useful to introduce a plate-shaped element 20 between the plates 9 and 10 in the overlapping area, i.e., within filter sector part C. Such plate-shaped element contributes to the structural stiffness of the filter sector and eliminates a possible backwash problem which could arise in certain rotational positions of the filter sector where filtrate flowing in a downward direction between plates 9 and 10 towards collecting means 7 could tend to escape through an aperture 19 located at a lower level and thereby re-wet the filtrate cloth 19 and solids deposited thereon.

In the embodiments of the present invention described and shown, the filter sector includes two separate elements 9 and 10. It may, however, also be possible to manufacture the filter sector in one piece, particularly if it is manufactured from a plastics material.

It may also be possible and suitable to compose the filter sector of more than the two elements 9 and 10.

I claim:

1. A filter sector for a filter disk of a rotating filter, including folded or corrugated means having ridges and valleys extending in a longitudinal direction of said means to form filtrate channels, and a filtering medium covering said means, wherein said means includes at least two elements (9, 10), each having parallel ridges (12, 11') and valleys (11, 12'), and that said at least two elements are located in an at least partly overlapping relationship, such that filtrate channels (13) of one element (9) intersect with filtrate channels (14) of the other element (10).

2. A filter sector according to claim 1, wherein said means includes two elements, (9, 10) being at least substantially equally shaped.

3. A filter sector according to claim 1, said elements are disposed such that there is communication between filtrate channels (13, 14) of said elements (9, 10) in zones of said partly overlapping relationship.

4. A filter sector according to claim 2 having the general shape of a sector of a circle with a radially outer end and a radially inner end, said elements (9, 10) substantially abut each other at wherein said radially outer end and at least approximately entirely overlap each other at said radially inner end.

5. A filter sector according to claim 2, wherein each of said elements substantially has the shape of a parallelogram.

6. A filter sector according to claim 3, wherein said communication exists between sides of said elements facing each other in zones of said partly overlapping relationship.

7. A filter sector according to claim 3, wherein apertures (19) are provided in said elements (9, 10), said apertures being adapted to lead filtrate flowing along filtrate channels on exposed sides of said elements into filtrate channels on non-exposed sides of said elements within said zones of said partly overlapping relationship.

8. A filter sector according to claim 7, wherein said apertures (19) are provided in said zones of overlapping relationship adjacent the transition between non-overlapping zones of said elements and said zones of overlapping relationship.

9. A filter sector according to claim 1, wherein a plate shaped element (20) is located between said elements (9, 10) within zones of said overlapping relationship.

10. A filter sector according to claim 1, wherein said folded or corrugated means is manufactured in one piece.

11. A filter sector according to claim 2, wherein said two elements are disposed so as to form a truncated sector of a circle, said sector of a circle being composed of three imaginary, substantially equally shaped figures shaped substantially as isoceles triangles, a first and a second of said triangles having their apices facing an outlet end of said filter sector, and a third of said triangles having its base facing said outlet end and being located between said first and said second triangles.

* * * * *